No. 731,957. PATENTED JUNE 23, 1903.
H. SCHIERHORST.
THIMBLE PUZZLE.
APPLICATION FILED JAN. 13, 1903.
NO MODEL.
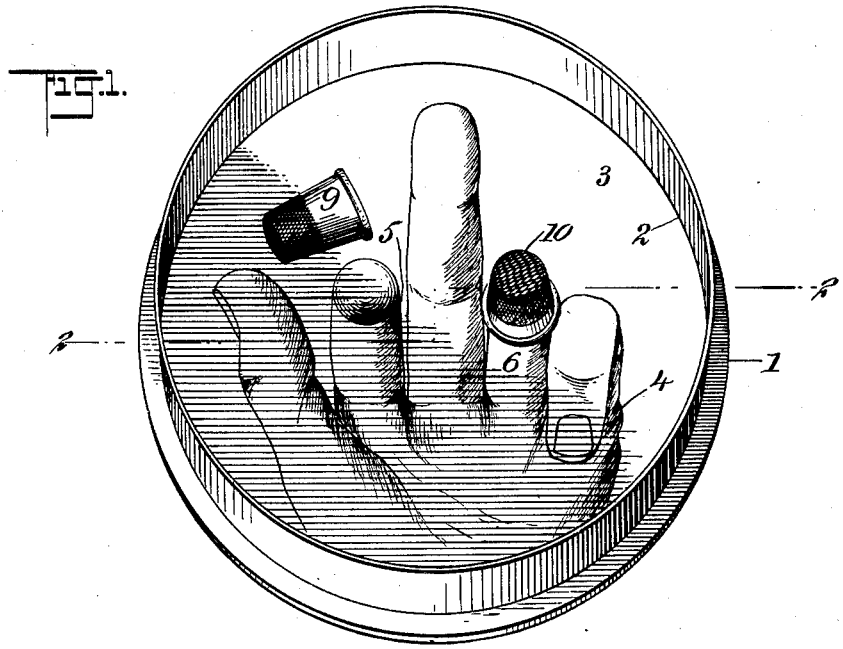
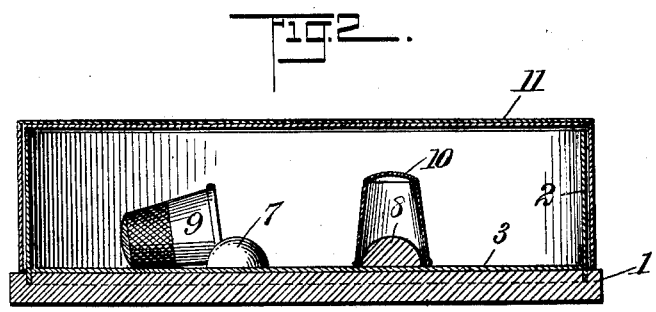
WITNESSES:
Julius H. Smith
Walton Harrison
INVENTOR
Henry Schierhorst
BY
Munn
ATTORNEYS.

No. 731,957. Patented June 23, 1903.

UNITED STATES PATENT OFFICE.

HENRY SCHIERHORST, OF NEW YORK, N. Y.

THIMBLE PUZZLE.

SPECIFICATION forming part of Letters Patent No. 731,957, dated June 23, 1903.

Application filed January 13, 1903. Serial No. 138,885. (No model.)

*To all whom it may concern:*

Be it known that I, HENRY SCHIERHORST, a citizen of the United States and a resident of the city of New York, borough of Manhattan, in the county and State of New York, have invented a new and Improved Thimble Puzzle, of which the following is a full, clear, and exact description.

My invention relates to articles of amusement, and more particularly to a device which I denominate a "thimble game."

Reference is to be had to the accompanying drawings, forming a part of this specification, in which similar characters of reference indicate corresponding parts in all the figures.

Figure 1 is a perspective view showing my device in use, and Fig. 2 is a vertical cross-section upon the line 2 2 of Fig. 1 looking toward the top thereof, the cover being in place.

Upon a base 1, preferably of wood, is mounted a substantially cylindrical member 2, which may be of paper or of any other material desired. Disposed at the bottom of this cylindrical member is a disk 3, provided with the representation 4 of a human hand, of which two of the fingers 5 6 are shortened, as shown in Fig. 1, for the purpose of indicating that the fingers are bent upward. Disposed upon the fingers 5 6 are the bosses 7 8, representing the upturned portions of the fingers. A pair of loose thimbles 9 10, of ordinary construction, are provided and may be thrown into the box or removed therefrom at will. A cover 11, preferably having the form of a cylindrical cap, may be provided for the purpose of retaining the thimbles within the box.

My device is operated as follows: A person removes the cap or cover 11 and holding the device by means of the base 1 tilts the box from side to side, so as to roll the thimbles 9 10 around in any manner he may see proper. The purpose is to lodge the thimbles upon the bosses 7 8; but of course the purpose may be varied—as, for instance, the operator may endeavor only to lodge one of the thimbles upon a particular boss, as shown at the right in drawings, or he may endeavor to lodge both of them upon the bosses.

It will be understood that when one of the thimbles is lodged upon a boss, as indicated in the drawings, the loose thimble may be rolled around without disturbing the thimble already in position. For instance, if the thimble 10 is lodged upon the boss 8 the operator by being somewhat careful may tilt the device slightly, so as to cause the thimble 9 to roll around and perchance to lodge upon the boss 7. The tilting need not necessarily disturb the position of the thimble 10 upon the boss 8.

Having thus described my invention, I claim as new and desire to secure by Letters Patent—

1. A thimble puzzle, comprising a box provided with the representation of a human hand having shortened fingers, bosses representing finger-tips disposed upon said shortened fingers for the purpose of apparently lengthening the same, and rolling bodies having annular portions free to encircle said bosses, and of a diameter substantially commensurate therewith for the purpose of simulating thimbles placed upon the tips of the fingers.

2. A thimble puzzle, comprising a box provided on its bottom with the representation of a human hand and with bosses disposed upon the fingers of said human hand for the purpose of simulating the tips of said fingers, and a plurality of thimbles disposed loosely within said box and free to lodge upon said bosses, thereby simulating the placing of thimbles upon said finger-tips, said thimbles having diameters substantially commensurate with those of said bosses.

3. A thimble puzzle, comprising a member provided with the representation of a human hand having fingers, bosses mounted upon said member and disposed coincident with the portions of said fingers for the purpose of simulating bent portions of fingers of the human hand, and a plurality of loose thimbles of proper diameter to neatly fit said bosses and free to lodge thereupon, thereby simulating the placing of thimbles upon the finger-tips.

In testimony whereof I have signed my name to this specification in the presence of two subscribing witnesses.

HENRY SCHIERHORST.

Witnesses:
JNO. M. RITTER,
F. N. HANOFORD.